March 10, 1931.  H. C. ARNAMAN  1,795,463
PORTABLE BARBECUE APPARATUS
Filed Aug. 27, 1928   5 Sheets-Sheet 5
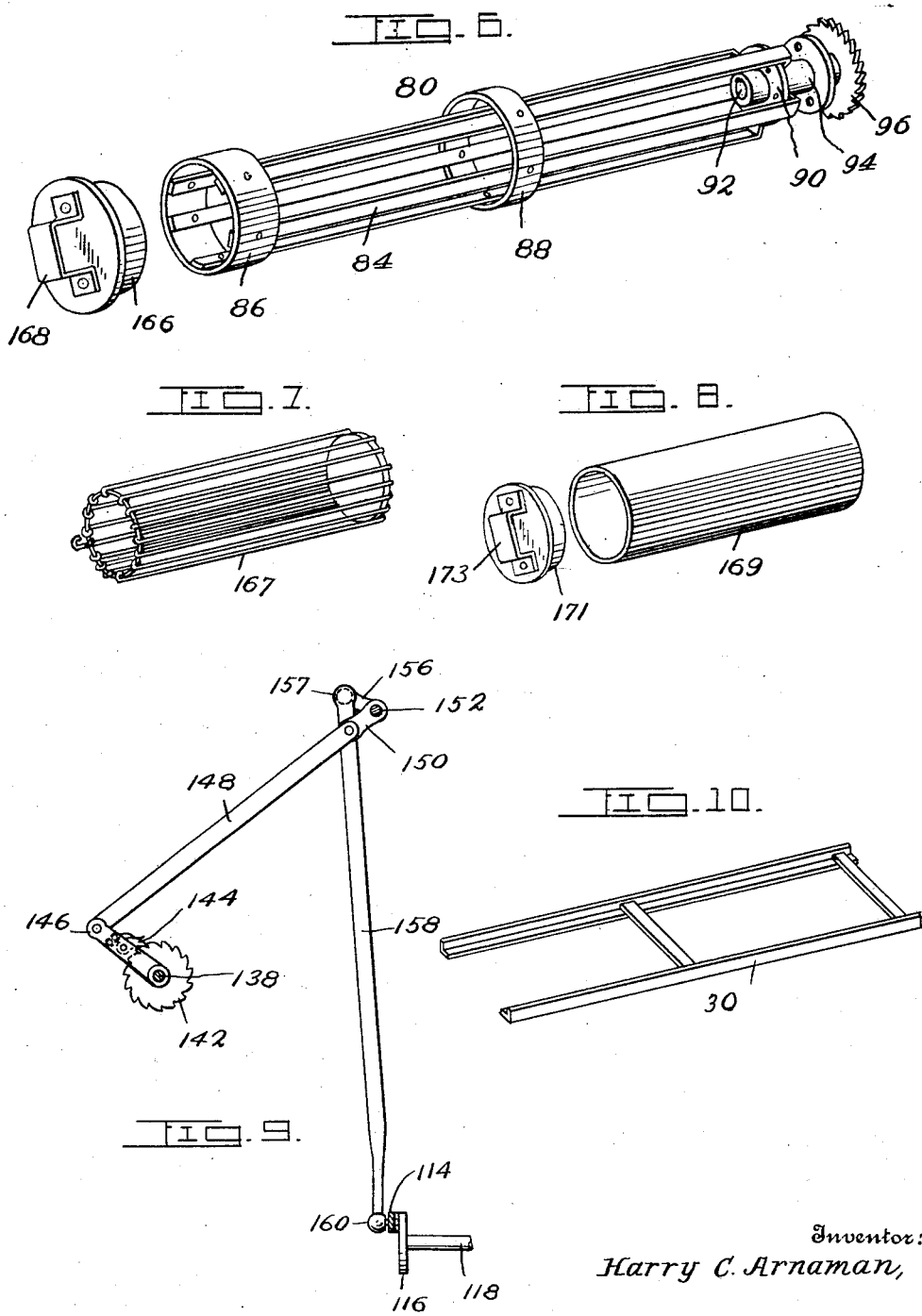
Inventor:
Harry C. Arnaman,
Witness:
Fred C. Fischer.
By F. G. Fischer,
Attorney Patented Mar. 10, 1931

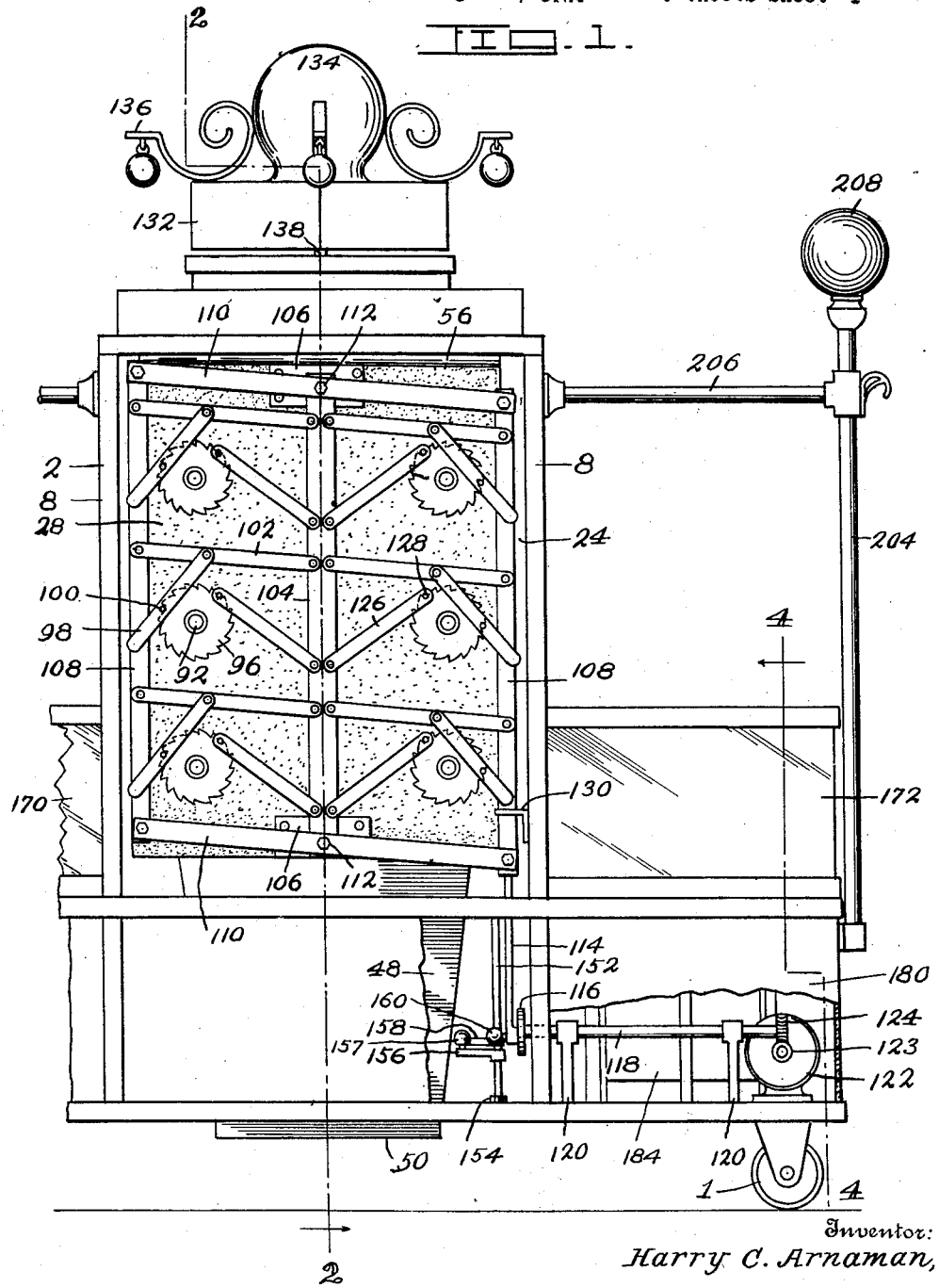

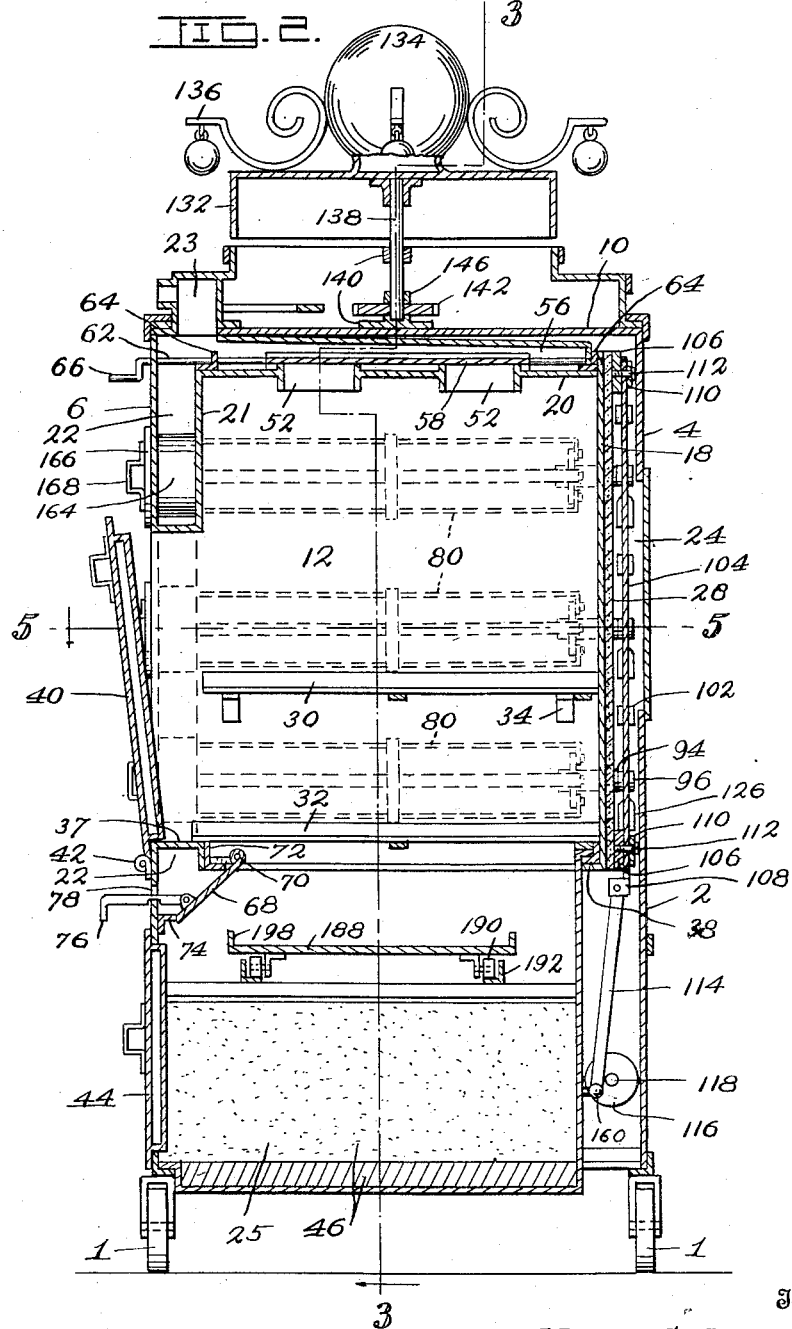

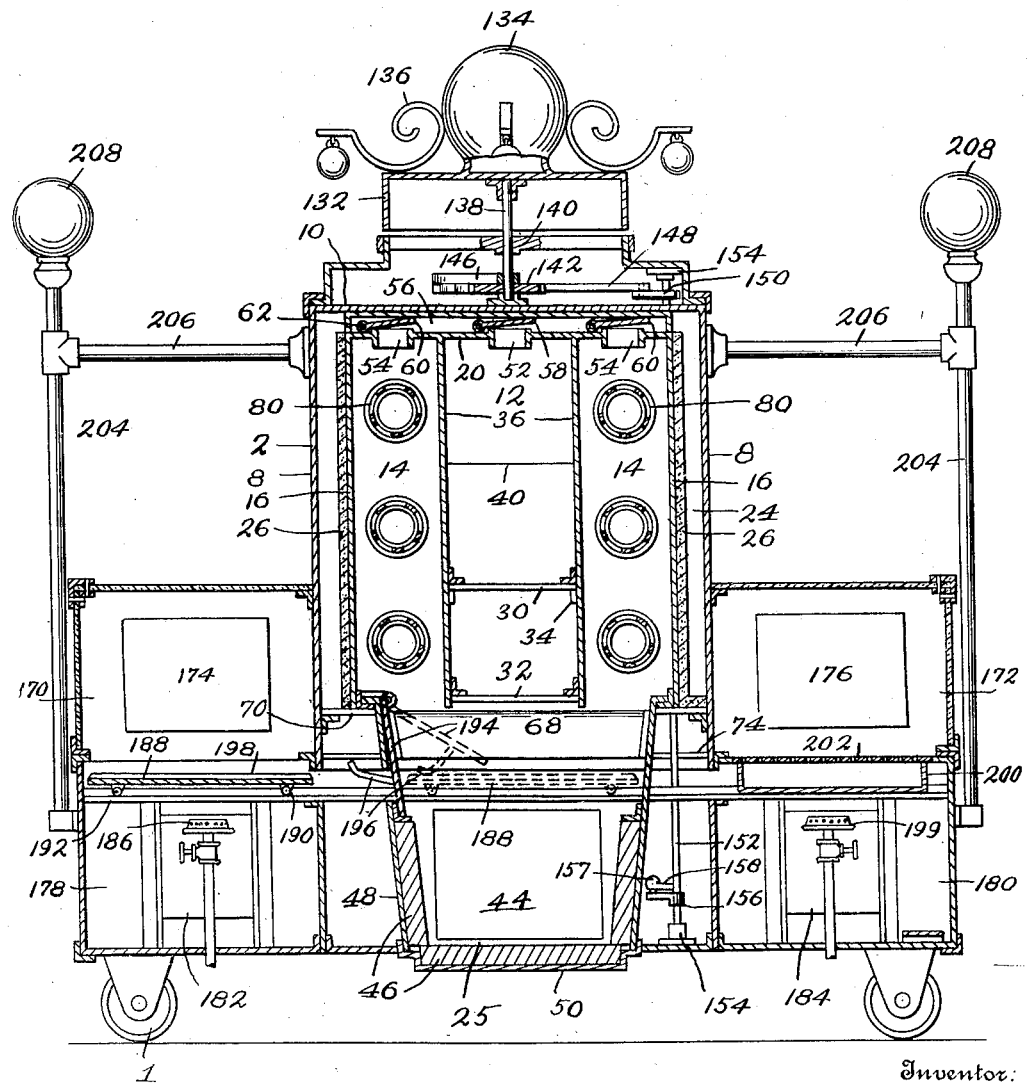

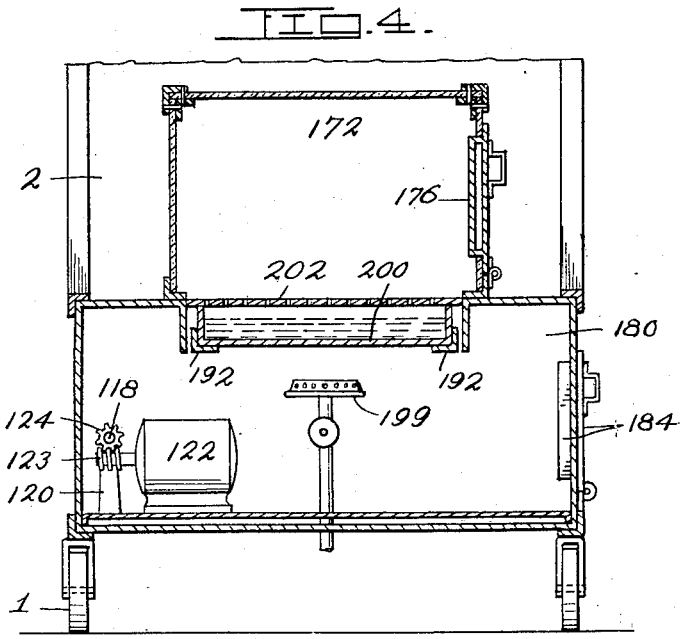
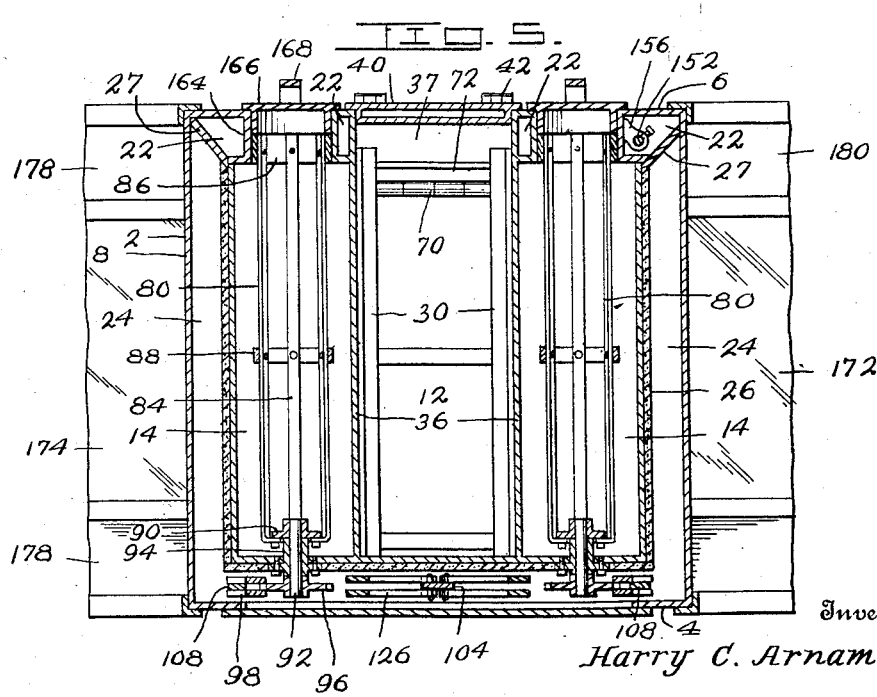

1,795,463

UNITED STATES PATENT OFFICE

HARRY C. ARNAMAN, OF KANSAS CITY, MISSOURI

PORTABLE BARBECUE APPARATUS

Application filed August 27, 1928. Serial No. 302,212.

My invention relates to barbecue ovens and one object is to provide an apparatus of this character whereby various kinds of meats and other edibles such as chili concarne, beans, etc., can be cooked in different ways.

A further object is to provide a portable apparatus of this character, which can be readily transported to picnic grounds, fair grounds, or wherever needed.

Another object is to provide an apparatus of this character which will present an attractive appearance and prove efficient in use.

Other objects will hereinafter appear, and in order that the invention may be fully understood reference will now be had to the accompanying drawings, in which:

Fig. 1 is a broken front elevation of the apparatus with the upper front wall removed.

Fig. 2 is an irregular vertical section on line 2—2 of Fig. 1.

Fig. 3 is an irregular vertical section on line 3—3 of Fig. 2.

Fig. 4 is a broken vertical section on line 4—4 of Fig. 1.

Fig. 5 is a horizontal section on line 5—5 of Fig. 2 with the oven door in closed position.

Fig. 6 is a detail perspective view of one of a number of rotary containers employed in carrying out the invention.

Figs. 7 and 8 are detail perspective views of utensils for use in the rotary containers.

Fig. 9 is a broken plan view of mechanism for driving the ornamental top of the apparatus.

Fig. 10 is a detail perspective view of an oven rack.

The apparatus is preferably built of fireproof material consisting of sheet metal walls secured to a frame made up largely of angle irons and mounted upon rollers 1, so that it can be readily moved from place to place.

Referring in detail to the different parts, 2 designates a main compartment consisting of a front wall 4, a rear wall 6, side walls 8, and a top wall 10.

The main compartment 2 is divided into a primary oven 12 and two secondary ovens 14, which latter are arranged at opposite sides of the former as shown by Figs. 3 and 5. The two outermost side walls 16 of the secondary ovens 14 and the front and top walls 18 and 20 of all three ovens are spaced inwardly from the walls of the main compartment 2 to leave an air space 24 and the side walls 16 and the front wall 18 are covered with asbestos 26 and 28, respectively, for the purpose of retaining the heat within the ovens, to the end that a saving of fuel may be effected. The rear wall 21 of the ovens is spaced inwardly from the rear wall 6 of the main compartment 2 to leave a flue 22 leading upwardly to a flue 23 through which the products of combustion from a fire-box 25 may escape. The flue 22 is separated from the air space 24 by means of vertical partitions 27.

The primary oven 12 is provided with removable racks 30 and 32 upon which meat to be barbecued is placed. The upper rack 30 is mounted upon brackets 34 secured to the partition walls 36 separating the primary oven 12 from the secondary ovens 14, while the rack 32 is supported on the bottom of a door casing 37 and an angle iron 38, which latter forms a part of the frame of the apparatus. Access is had to the interior of the primary oven 12 through a rear door 40 connected by hinges 42 to the rear wall 6, and access to the interior of the fire-box 25 is had through a rear door 44. As shown more clearly by Fig. 3, the fire-box 25 is arranged beneath the primary and secondary ovens 12 and 14, respectively, and is lined with fire-brick 46 for preventing its sheet metal side and bottom walls 48 and 50, respectively, from burning out.

The heat and other products of combustion passing from the fire-box 25 through the primary oven 12 and the secondary ovens 14, escape through flues 52 and 54, respectively, located in the top wall 20 and communicating with a duct 56 leading to the main flue 23. The flues 52 and 54 are equipped with dampers 58 and 60, respectively, each of which is mounted upon a shaft 62 operably mounted in bearings 64 secured to the top wall 20. Each shaft 62 projects through the rear wall 6 and is bent to form a handle 66 whereby it may be turned to open and close its respective damper.

68 designates a damper for controlling communication between the fire-box 25 and the lower portion of the flue 22. Said damper 68 is connected by a hinge 70 to an angle bar 72 forming a portion of the frame of the apparatus. The lower margin of the damper 68 is arranged to close against an angle bar 74 and said damper is controlled with a handle 76 extending through a slot 78 in the rear wall 6.

Each secondary oven 14 is provided with a plurality of rotary containers 80 made in skeleton form so that the heat and products of combustion from the fire-box 25 may circulate freely through said containers. In the present instance I have shown each container consisting of a plurality of equally spaced longitudinal bars 84 and rings 86 and 88 to which said bars 84 are rigidly secured. The bars 84 are bent at angles at one end and secured to a disk 90 provided with a fixedly mounted and axially disposed stub shaft 92 which is journaled in a bearing 94 secured to the front wall 18 of the ovens 12 and 14.

Each stub shaft 92 is provided at one end with a fixedly mounted ratchet wheel 96 adapted to be rotated step by step by a pair of links 98 provided with a transverse pin 100 for engaging the teeth of the respective ratchet wheel 96. The links 98 are pivotally connected at their upper ends to links 102 which are pivotally connected at their adjacent ends to a support 104 consisting of a vertically disposed bar secured at its upper and lower ends to plates 106 fixed to the front wall 18. The outer ends of the links 102 are pivotally connected to a pair of vertically disposed reciprocatory bars 108 which are pivotally connected at their upper and lower ends to rocker arms 110 mounted intermediate their ends upon pivots 112 extending through the bar 104 and secured to the plates 106. The lower end of one of the bars 108 is pivotally secured to the upper end of a connecting rod 114 which is pivotally secured at its lower end to a disk 116 fixedly mounted upon a shaft 118 journaled in bearings 120. The shaft 118 is driven by an electric or other suitable motor 122 through the intermediary of gears 123 and 124.

The ratchet wheels 96 are prevented from turning backwardly as the links 98 move forwardly by pawls 126 pivotally connected at their lower ends to the bar 104 and provided at their upper ends with transverse pins 128 for engagement with the teeth of the respective ratchet wheels 96. Any tendency of the connecting rod 114 to move the lower end of the bar 108, to which it is connected, backwardly or forwardly, is overcome by a guide 130.

In addition to providing the mechanism above described for rotating the containers 80 step by step, I also provide means for rotating an ornamental top surmounting the main compartment 2 and in the present instance consisting of a rotary member 132 surmounted by an electric or other suitable lamp 134 and ornamental brackets 136 for attracting the attention of prospective customers. The rotary member 132 is fixedly mounted upon a shaft 138 journaled in bearings 140 and provided with a fixedly mounted ratchet wheel 142.

The ratchet wheel 142 is rotated step by step by means of a spring pressed pawl 144 pivotally mounted upon a lever 146 which is rockably mounted at one end upon the shaft 138. The opposite end of the lever 146 is pivotally secured to one end of a connecting rod 148 which is pivotally secured at its opposite end to a crank 150 fixedly mounted upon the upper portion of a shaft 152 extending vertically through the flue 22. The shaft 152 is journaled at its lower and upper ends in bearings 154 and provided at its lower portion with a fixedly mounted crank 156 having a universal connection 157 with the rear end of a connecting rod 158 having a universal connection 160 at its forward end with the wrist pin 117.

The rings 86, forming a part of the rear ends of the rotary containers 80, are journaled in annular bearings 164 extending transversely through the flue 22 and fixed to the rear walls 6 and 21 as best shown by Fig. 5. Closures 166 with handles 168 are provided for closing the rear ends of the containers 80 and the rear ends of the bearings 164 so that the products of combustion passing upwardly through the secondary ovens 14 cannot escape through said bearings 164 or said closures 166. Food to be cooked may be placed directly within the containers 80, or within grills 167, or canisters 169 which may be placed in said rotary containers 80. The open end of each canister 169 is provided with a removable closure 171 equipped with a handle 173.

Secondary compartments 170 and 172 are arranged at opposite sides of the main compartment 2 and are provided at their rear sides with doors 174 and 176, respectively. The top, front, and two of the side walls of said secondary compartments 170 and 172 consist preferably of glass to add to the attractive appearance of the apparatus. The secondary compartments 170 and 172 are arranged above two lower compartments 178 and 180, respectively, located at opposite sides of the fire-box 25 and are provided at their rear sides with doors 182 and 184, respectively. The compartment 178 is equipped with a gas or other suitable burner 186 above which a hot plate 188 is located.

The hot plate 188 is mounted upon rollers 190 arranged to traverse a track consisting of a pair of rails 192 extending through the upper portion of the fire-box 25 and the compartments 178 and 180, Fig. 3. In addition to constituting an element upon which hambergers, eggs and other articles of food can be fried, the hot plate 188 may also be used as an emergency damper by running it into the fire-box 25 for preventing the flames from entering the primary and secondary ovens 12 and 14, respectively, should it be found that the food in said ovens is cooking too rapidly. Normally the opening in the fire-box 25 through which the hot plate 188 passes is closed by a self-closing gate 194 provided at one side with an outwardly projecting arm 196 in line with one of the flanges 198 extending longitudinally of each side of the hot plate 188, so that when the latter is pushed into the fire-box 25 as above stated one of the flanges 198 will strike the arm 196 and lift the gate 194, as shown by dotted lines Fig. 3, and thus prevent it from scraping off any food which may be cooking upon said hot plate 188.

The lower compartment 180 is equipped with a suitable burner 199 above which a pan 200 is supported by the rails 192. The pan 200 is provided with a perforated top 202 upon which frankfurters and other articles of food may be steamed when water is placed in the pan 200 and heated by a flame from said burner 199.

In addition to the ornamentation provided by the rotary member 132, the lamp 134 and the brackets 136, I provide the apparatus with ornamental bars 204 and 206 which support electric or other ornamental lamps 208.

In practice the primary oven 12 serves as a receptacle in which large cuts of meat or small pigs may be barbecued by the heat and smoke arising from the fire-box 25 and passing upwardly through the primary oven 12 from which it escapes through the flue 52 into the duct 56 which conducts the heat and smoke to the main flue 23. The articles being barbecued may be placed directly upon the racks 30 and 32 or in suitable pans or grills, not shown, placed upon said racks. The smaller cuts of meat may be barbecued in the rotary containers 80 or the grills 167, while beans, chilli, etc., may be cooked in the canisters 169 which, like the grills 167, are removably arranged within the containers 80. By providing the ovens 12 and 14 with dampers 58 and 60, respectively, the temperature in each oven may be independently regulated to a large degree by proper manipulation of said dampers, while if a low temperature is desired in all of the ovens the dampers 58 and 60 may be closed and the damper 68 may be opened to allow all of the products of combustion to pass through the flue 22 arranged between the rear wall 21 of the ovens and the rear wall 6.

When the rotary containers 80 are in use they are rotated step by step through the intermediary of the ratchet wheels 96 and their actuating mechanism hereinbefore described, so that articles of food within said containers will be uniformly exposed to the smoke and heat passing upwardly through said containers.

From the foregoing description it is apparent that I have provided a barbecue apparatus which is well adapted for the purposes intended, and while I have shown one form of said apparatus I reserve all rights to such changes and modifications as properly fall within the spirit and scope of the invention as claimed.

Having thus described my invention, what I claim and desire to secure by Letters Patent, is:

1. In an apparatus of the character described, a main oven, secondary ovens arranged at opposite sides of said main oven, an outlet flue for each oven, a fire-box arranged beneath and communicating with the interior of said ovens so that the products of combustion may pass from said fire-box into the ovens, and a damper for the outlet flue for each oven.

2. In an apparatus of the character described, a main oven, secondary ovens arranged at opposite sides of said main oven, a fire-box arranged beneath and communicating with the interior of said ovens so that the products of combustion may pass from said fire-box through the ovens, a duct communicating with the upper portion of the ovens, dampers for controlling communication between the ovens and said duct, a casing surrounding the top and sides of said ovens and spaced from the latter to leave an intervening air space, partitions dividing a portion of said air space to form a flue which communicates with the fire-box and said duct, and a main flue communicating with the first mentioned flue and the duct and leading from the upper portion of the casing.

3. In an apparatus of the character described, an oven, a fire-box arranged beneath said oven, a compartment arranged beside said fire-box, a support extending from the compartment into the fire-box, a hot-plate mounted upon said support and adapted to be moved into the fire-box to cut off the heat from the latter to the oven, and a gate which normally closes said opening and is adapted to be opened by said hot-plate.

4. In an apparatus of the character described, a main compartment, ovens arranged within said main compartment, a fire-box arranged beneath said ovens, secondary compartments arranged at opposite sides of the main compartment, compartments arranged at opposite sides of the fire-box and beneath said secondary compartments, dampers for said ovens, burners in the compartments at the opposite sides of the fire-box, a hot-plate in one of the last-mentioned compartments, and a steam table in the other of the last mentioned compartments.

5. In an apparatus of the character described, a main oven, secondary ovens arranged at opposite sides of said main oven, rotary containers mounted in said secondary ovens, ratchet wheels fixed to said rotary containers, links for actuating said ratchet wheels, a pair of vertically disposed reciprocatory bars, rocker arms for actuating said reciprocatory bars, means connected to the reciprocatory bars for actuating said links, and electrically driven mechanism connected to one of the reciprocatory bars for actuating the latter.

In testimony whereof I affix my signature.

HARRY C. ARNAMAN.